US006167912B1

(12) United States Patent
Stephens

(10) Patent No.: US 6,167,912 B1
(45) Date of Patent: Jan. 2, 2001

(54) METHOD AND COMPOSITION FOR GROUTING WATER-FLOODED CONDUITS

(76) Inventor: Patrick J. Stephens, 1276 Chuckanut Dr., Bellingham, WA (US) 98225

( * ) Notice: Under 35 U.S.C. 154(b), the term of this patent shall be extended for 0 days.

(21) Appl. No.: 09/199,394

(22) Filed: Nov. 25, 1998

Related U.S. Application Data

(60) Provisional application No. 60/066,853, filed on Nov. 25, 1997.

(51) Int. Cl.[7] ................................................. F16L 55/164
(52) U.S. Cl. .......................... 138/98; 138/97; 138/140; 264/269
(58) Field of Search .................... 138/97, 98, 105, 138/140; 264/36.16, 269; 156/94, 294; 405/154

(56) References Cited

U.S. PATENT DOCUMENTS

| | | | |
|---|---|---|---|
| 4,118,241 | * 10/1978 | Bernett | 106/90 |
| 4,588,443 | * 5/1986 | Bache | 106/89 |
| 4,956,032 | * 9/1990 | Hahn et al. | 138/97 |
| 5,063,967 | 11/1991 | Stephens . | |
| 5,141,363 | * 8/1992 | Stephens | 405/146 |
| 5,241,993 | * 9/1993 | Stephens | 138/97 |
| 5,419,632 | * 5/1995 | Stephens | 366/3 |
| 5,424,154 | * 6/1995 | Borodousky | 430/5 |
| 5,645,375 | * 7/1997 | Stephens | 138/98 |
| 5,791,378 | * 8/1998 | Stephens | 138/97 |
| 5,791,380 | * 8/1998 | Onan et al. | 138/149 |
| 5,795,060 | * 8/1998 | Stephens | 366/2 |
| 5,803,596 | * 9/1998 | Stephens | 366/10 |

* cited by examiner

Primary Examiner—James Hook
(74) Attorney, Agent, or Firm—Todd N. Hathaway

(57) ABSTRACT

A method and composition for grouting a water-flooded cavity. Water and portland cement are combined to form a fluid cement slurry, the slurry being substantially free of sand or other aggregate material, and the slurry is then colloidally mixed so as to achieve an ultra-fine mixing thereof. An anti-washout admixture is mixed with the slurry in a predetermined amount, and a superplasticizing agent is also preferably included, both the anti-washout admixture and the superplasticizer agent being substantially free of defoaming agents. Finished foam is then mixed with the slurry to form a stable foamed cement grout which is injected into the water-flooded cavity. The anti-washout admixture is preferably a modified cellulose ether solution.

20 Claims, 3 Drawing Sheets

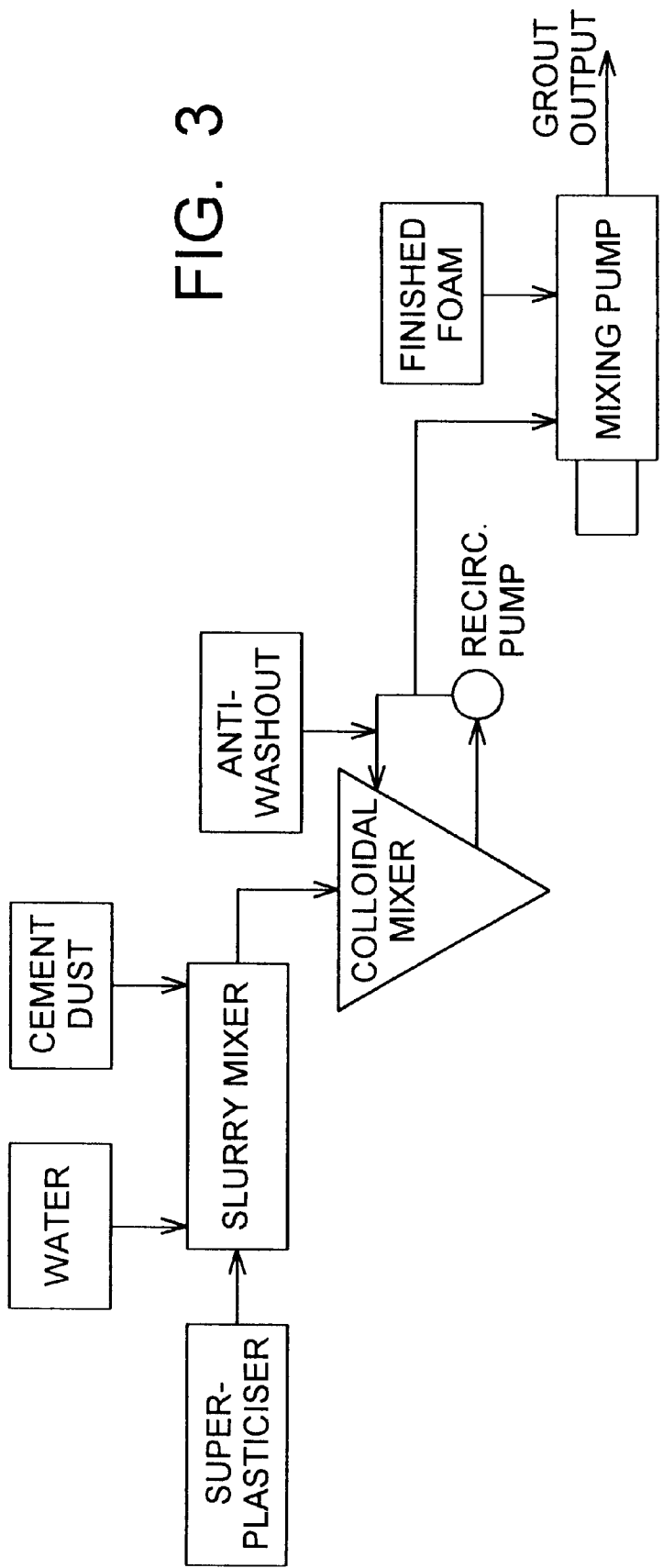

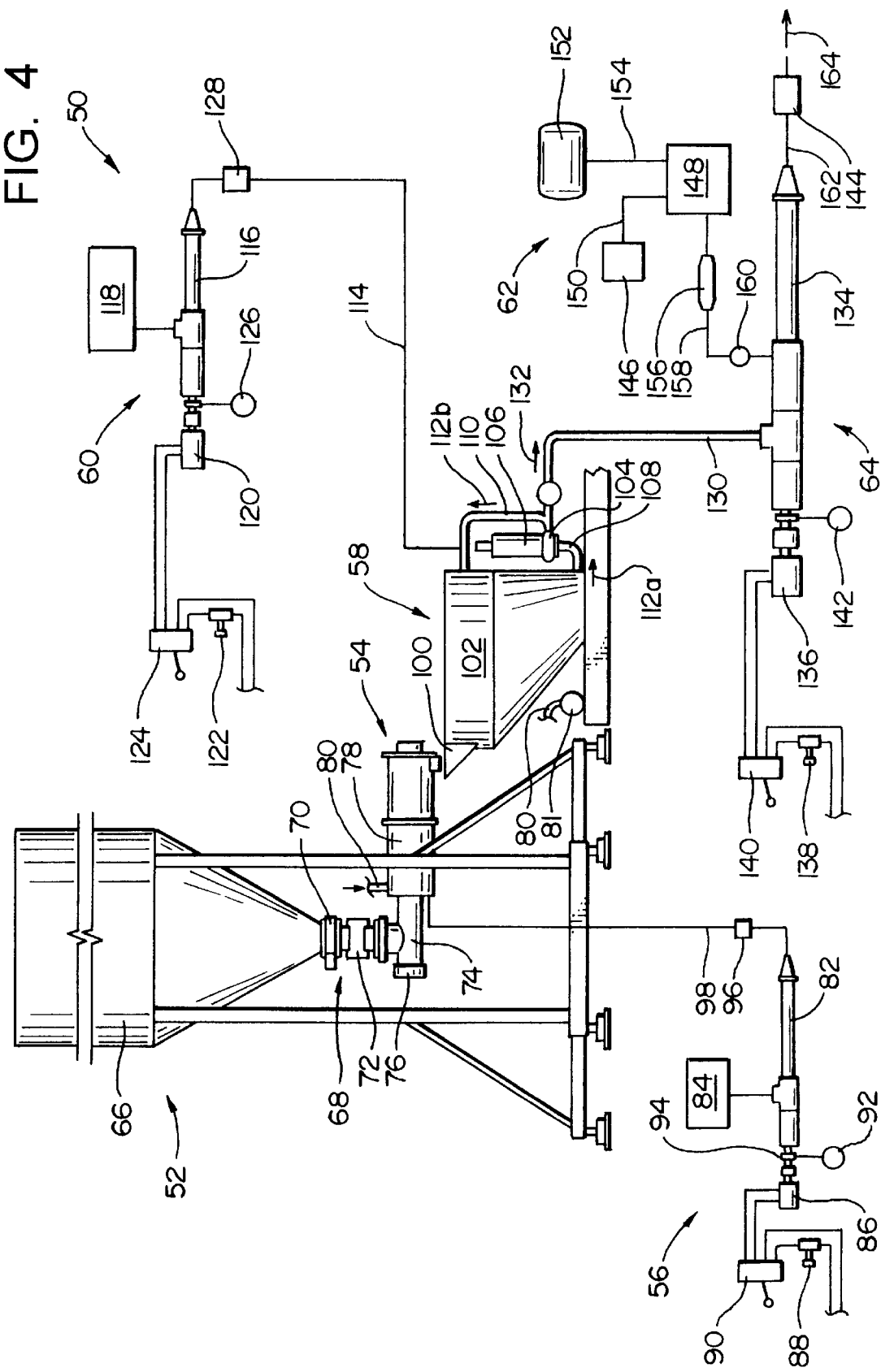

METHOD AND COMPOSITION FOR GROUTING WATER-FLOODED CONDUITS

This application claims benefit to Provisional Application Ser. No. 60/066,853, filed Nov. 25, 1997.

FIELD OF THE INVENTION

The present invention relates generally to the installation and renovation of subterranean conduits, and, more particularly, to the grouting or backfilling of such conduits where an annular space in or around the conduit is contaminated or flooded with water.

BACKGROUND

The installation and renovation of underground conduits frequently requires the placement of cementitious materials to stabilize the conduit. Two exemplary categories of such work to which the present invention pertains (but is not limited) are (i) tunnel backfill grouting, and (ii) slipliner grouting. These two types of grouting are quite different in a number of respects, but they share related problems stemming from the presence of water in the voids which are to be filled with the grout.

Usually considered to be the less difficult of these two types of grouting, tunnel backfill grouting involves filling the space between a conduit and the surrounding geological formation, usually (but not always) in a new installation. For example, in constructing a tunnel a bore is formed through the subterranean formation and a concrete liner is installed in this to form the tunnel itself, for containing and transporting water, traffic, etc. in a protected environment. To stabilize and support the tunnel liner, a fill material is ordinarily placed in the annular space between the liner and the wall of the bore, and for most installations a cementitious mixture is considered to be most satisfactory for this purpose. For the purpose of this invention, the term "tunnel backfill" includes not only this type of construction, where a large-diameter (often segmental) liner is installed in a new or previously unlined subterranean bore, but also other installations where the liner is a rigid member which is able to carry a substantial external load, such as a steel or heavy gauge fiberglass liner installed in a new excavation or an old bore/pipe, to give just a few examples.

Slipliner grouting, in turn, is often somewhat more complicated from a technical standpoint, due to the comparative delicacy of the liners which are ordinarily used in this kind of work. In sliplining, an existing, deteriorated conduit (a deteriorated concrete sewer line, for example) is renovated by installing a new liner in the existing pipe. In order to minimize the reduction and flow capacity, the thickness of the liner and also the annular gap between the liner and the pipe must be kept to a minimum. For example, slipliner installations often employ a comparatively thin high-density polyethylene (HDPE) liner with only an 1–3 inch clearance between the outside of the liner and the old pipe. The grout material—usually cementitious grout—is installed by flowing this through this narrow annulus, but injection pressures must be kept quite low (e.g., below 3 psi in the case of typical HDPE liners): excessive grout injection pressures will tend to collapse the liner, with disastrous consequences for the job. Moreover, it is important that the density of the grout not be so high as to cause the liner to "float" to the top of the old pipe or other conduit, since this again will tend to cause the liner to collapse during grouting, and also exposes the liner to external pressures exerted by the surrounding geological formation in those areas where the original pipe/conduit has been penetrated by erosion or has failed structurally.

As was noted above fluid cementitious materials are generally used as the grout materials for both tunnel backfill and slipliner grouting. A category of cementitious grout materials which is particularity useful in both tunnel backfill grouting and slipliner grouting consists of cellular cement grouts, in which an aqueous finished foam material is added to a cement slurry to entrain large amounts of air in the grout; an example of such a foamed cement grout for use in sliplining is provided in U.S. Pat. No. 5,063,967, the inventor of which is the same as in the present matter. Such cellular cement grouts have significant economic advantages for both tunnel backfill and slipliner grouting, since the large volumes of entrained air reduce the amount of Portland cement which is required to complete the fill. Moreover, in the case of slipliner grouting, the use of foamed cement grouts permits the density of the grout to be kept low enough to prevent the liner from floating (when the latter is kept full or partially full of water), and the fluidity of the material permits it to be injected lengthwise through the annulus over long distances without developing excessive injection pressures which might collapse the liner.

Although cellular cement grouts are thus highly advantageous for tunnel backfill and slipliner grouting, in both cases the use of this material can become extremely difficult where the annular space (i.e., the space between either the tunnel liner and bore or the slipliner and original pipe) is flooded or otherwise contains large amounts of water. This is a very common situation, due to eboth the intrusion of naturally-occurring underground water and also because in many cases (especially in sliplining work) it is not feasible to completely evacuate or stop the flow of water through the conduit or through adjacent conduits which are in communications with the conduit which is being worked on, such as is often the situation with municipal sewer lines.

The presence of large amounts of water (often moving) in the annulus plays havoc with the grouting process. To begin with, the water tends to cause excessive "washout" of the cement fines, leading to unacceptable losses in effective yield (i.e., excessive grout material is required in order to fill the cavity), and also to severe loss of compressive strength in the cured installation. Moreover, when using cellular cement grouts, the water tends to cause stratification in the grout material and collapse of the bubble structure, so that the bubbles migrate to the top of the annulus and the cement slurry to the bottom. The collapse of the bubble structure leads to an even more severe loss in effective yield, and, in the case of the slipliner grouting, the accumulation of heavy slurry material in the bottom of the annulus tends to float the liner to the top of the old pipe/conduit, leading to possible collapse and the other kinds of problems described above.

In the case of tunnel backfill grouting, there have been some limited attempts at overcoming these problems in the past, however none of these has proven truly successful in practice. The relevant prior art of which Applicant is aware at the time of this application includes U.S. Pat. No. 4,419, 135 (Hoge), in which an effort was made to deal with the problem of ground water in tunnel backfill situations by adding a superplasticizer and pituitous polyethylene oxide water thickening agent to a foamed concrete grout mixture. In practice, this material has been found unsuitable in a number of respects. Firstly, it has been found difficult or impossible to produce a stable, homogenous mixture using the Hoge composition, with the material tending to separate into long, "gooey" strings which cannot be pumped or worked with effectively, and which are not satisfactory from the standpoint of quality control and final compressive strength. Furthermore, it is difficult or impossible to flow or pump the Hoge composition over any significant distance through an annulus; the examples given in the Hoge patent generally show the material simply being dumped into the cavity ("free-fall" installation) rather than being pumped, and the longest distance which the material is shown to flow through a tunnel is 850 lineal feet "before the flow rate fell to zero." In modern tunneling installations, the grout must be able to flow not hundreds but thousands of feet through the annulus, or else access points (e.g., drill holes) must be provided from either the surface or the interior of the tunnel at many points along its length to permit sequential grouting, at great cost. Still further (although the reference does not suggest its use for this purpose), the Hoge composition would develop excessive back pressures if one were to attempt to use this for slipliner grouting, which would cause the liner to collapse almost immediately.

Accordingly, there exists a need for a method and composition for grouting annular spaces in underground conduits which are flooded or heavily contaminated with water, which eliminates the problem of washout of the cementitious fines in a foamed cement grout and the resultant loss of yield. Still further, there is the need for such a method and composition in which the presence of water will not cause segregation of the grout components and collapse of the bubble structure. Still further, there exists a need for such a method and composition in which a foamed cement grout will maintain a stable, homogenous mixture, and in which the grout is highly fluid and can be pumped into an annulus over very long distances (i.e., distances well in excess of 1,000 lineal feet) without the flow rate reaching zero. Still further, there is a need for such a method and composition in which the cellular cement grout is sufficiently fluid that low injection pressures can be maintained so as to avoid collapse of a slipliner in slipliner grouting, and in which the density of the grout can be kept sufficiently low to avoid the grout causing a water-containing slipliner to float to the top of the annulus.

SUMMARY OF THE INVENTION

The present invention has solved the problems cited above, and is a method and composition for the grouting of water-flooded annular spaces.

Broadly, the method comprises the steps of: (1) combining hydraulic cement and water in predetermined amounts to form a fluid cement slurry, (2) colloidally mixing the cement slurry so as to achieve ultra-fine mixing thereof, (3) adding a liquid anti-washout admixture to the slurry in a predetermined amount, (4) adding finished foam to the slurry in a predetermined amount after the colloidal mixing and after addition of the anti-washout admixture, so as to form a stable foamed cement grout, and (5) injecting the foamed cement grout into the annular cavity.

The method may further comprise the step of adding superplasticizer to the slurry in a predetermined amount.

The cement used in the present invention is neat cement which is substantially free of sand or any other aggregates. The anti-washout agent is preferably a modified cellulose ether solution which is substantially free of any anti-foaming agents.

The water-to-cement ratio of the grout can be in the range from about 0.4–1.0, and the unit weight of the grout after addition of the finished foam can be in the range from about 40–90 pcf, with 50–75 pcf being preferable for the majority of applications.

The anti-washout agent noted above is preferably added at a metered rate in the range from about 5–20 ounces per hundredweight of cement, with a range of about 8–12 ounces per hundredweight of cement being preferable for the majority of applications.

BRIEF DESCRIPTION OF THE DRAWINGS

FIG. 3 is a block diagram illustrating the steps in the preparation of the anti-washout cellular cement grout in accordance with the present invention; and FIG. 4 is an elevational, somewhat schematic view showing the components of the apparatus for preparing the grout in accordance with the present invention, which correspond to the elements of the block diagram of FIG. 3.

DETAILED DESCRIPTION

A number of the individual mixing phases and components which are employed in the present invention are disclosed in Applicant's following U.S. patents/patent applications, each of which is incorporated by reference herein in its entirety: U.S. Pat. No. 5,645,375; U.S. Pat. No. 5,424,154; U.S. Pat. No. 5,419,632; U.S. Pat. No. 5,241,993; U.S. Pat. No. 5,141,363; U.S. Pat. No. 5,795,060; U.S. Pat. No. 5,803,596.

As was noted above, the present invention is directed to tunnel backfill and sliplining grouting situations where the annulus is flooded or otherwise contains significant amounts of water. Due to the added cost (up to $35.00/yard), the use of anti-washout foam cement grouts in accordance with the present invention will ordinarily be limited to those instances where significant amounts of water are present in the void, rather than situations where the annulus or void is comparatively dry.

Figure 1:
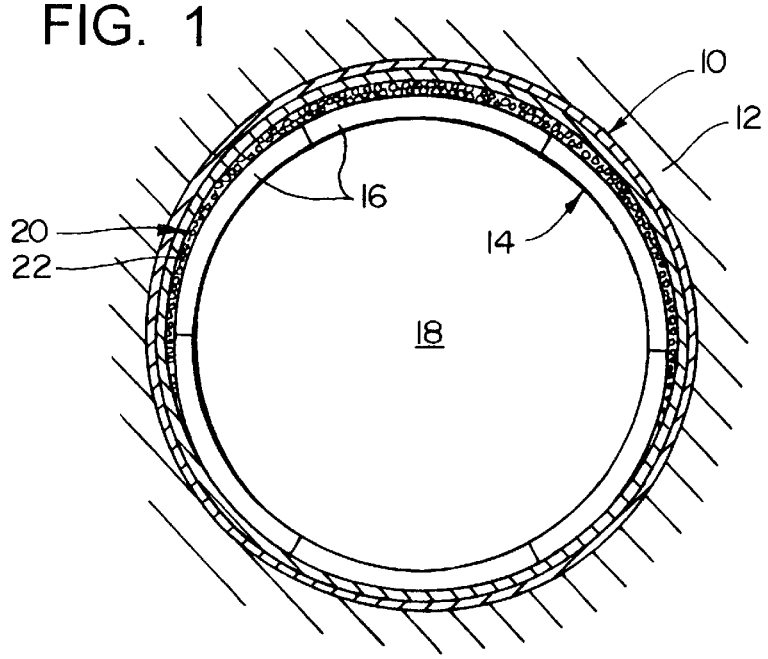
FIG. 1 is a cross sectional end view of a tunnel, showing the manner in which the backfill material is used to fill the annular cavity between the liner and bore.
Figure 2:
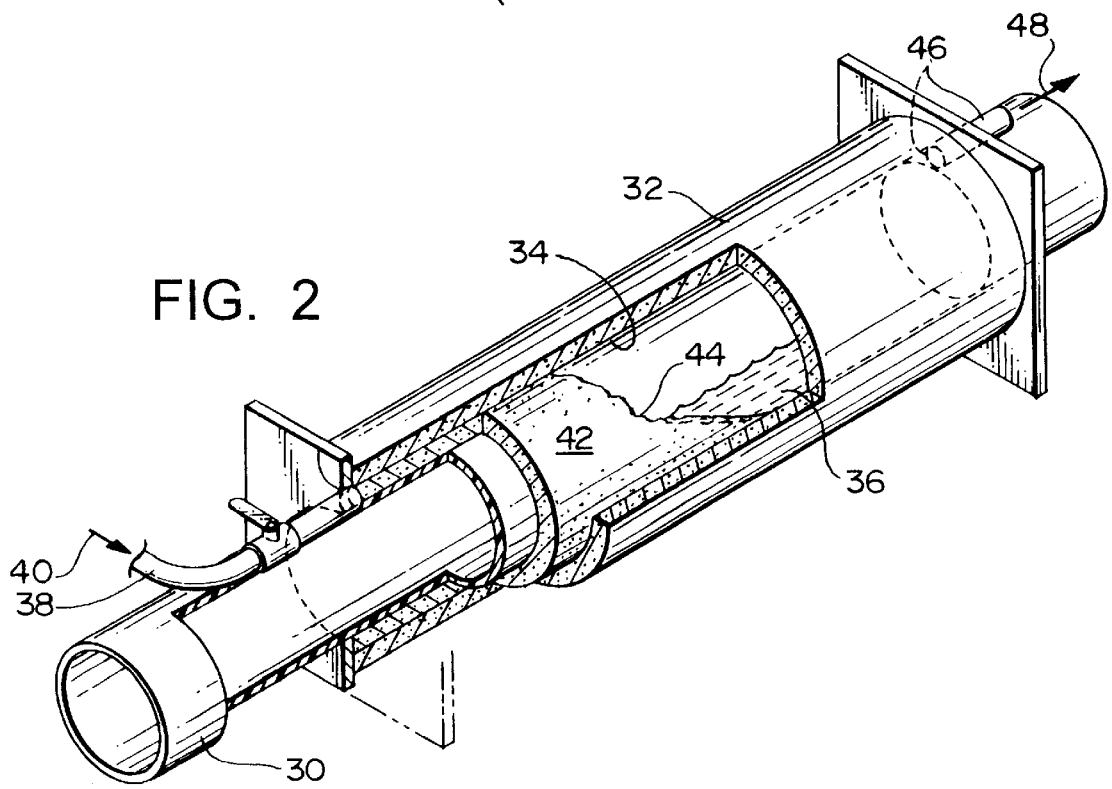
FIG. 2 is a perspective, somewhat schematic view showing the manner in which a section of pipe is renovated by sliplining and grout is injected to fill the annular space between the slipliner and the old pipe.

Accordingly, FIGS. 1 and 2, respectively, illustrate a typical tunnel backfill installation and a typical slipliner grouting installation. As was described above, in tunnel backfill grouting (see FIG. 1) there is a bore 10 formed through the subterranean formation 12 and a liner 14 which is installed in this. In the particular example which is shown in FIG. 1, the liner is made up of a plurality of concrete liner segments mounted around the interior 18 tunnel. The annular gap 20 between the exterior of the liner and the bore 10 is filled with the cellular cement grout 22 of the present invention, which as it is installed displaces any water which is present in this area.

FIG. 2, in turn, shows a slipliner grouting installation in which a thin wall plastic (e.g., HDPE) liner pipe 30 has been installed inside a deteriorated existing conduit 32, such as a deteriorated concrete sewer pipe. An annular space 34 is formed between the outside of the liner and the inner surface of the old pipe, and as can be seen in FIG. 2, this may be flooded with water 36. To grout the annulus, bulkheads are installed around the liner at the ends of the section to be grouted, and grout is injected under pressure through an injection line 38, as indicated by arrow 40. As this is done, the grout 42 flows longitudinally through the annulus 34, so that its leading edge 44 displaces the water from the cavity, the latter being discharged through a vent pipe 46 at the opposite end of the section being grouted, as indicated by arrow 48.

The grout composition which is provided by the present invention resists washout of the cement slurry, so that the leading edge (e.g., see 44 in FIG. 2) remains substantially intact as the grout flows into the annulus, rather than washing out and stratifying. Hence, effective yield is preserved, and in the case of slipliner grouting floating/crushing of the liner pipe is avoided.

The primary constituents of the cellular grout of the present invention are Portland cement, water, anti-washout admixture, and finished foam, with a superplasticizer admixture also preferably being included. Each of these components will be described below.

The cement dust for use in the present invention may be any suitable hydraulic cement, and is preferably a Portland cement; for example, Medusa Type I, II, III, IV, V, and 1P cements are suitable types for use in the present invention. As used in this disclosure, the term "cement" means substantially "neat" cement, and particularly excludes mixes which include any significant amount of sand, gravel or other aggregate material, although very small amounts of sand may be present in some applications.

The water used in the grout can be any water (e.g., fresh or salt) which is suitable for causing hydration of the cement, although in applications where the grout may be in contact with corrodible components it is preferable that the water be free of chloride, sulfate and other ions which might cause corrosion.

The superplasticizer may be any of the various superplasticizer materials known to those skilled in the art which are compatible with finished foam materials, so long as these do not contain any significant amount of anti-foaming agents or materials. In the particular examples which are given below, the superplasticizer material is "Rheobuild 200B", available from Masterbuilders, Inc., Admixture Division, 23700 Chagrin Blvd., Cleveland, Ohio 44122, U.S.A.

The anti-washout admixture, in turn, is preferably a modified cellulose ether-based material in a liquid solution. A particular anti-washout admixture which is used in the examples set forth below is based on "Rheomac UW450", available from Masterbuilders, Inc., Admixture Division, specially modified by the supplier to exclude the antifoaming constituents which are normally present, (the specially modified product being available as PS1151); the exclusion of anti-foaming agents is important for compatibility with the finished foam which is added to the slurry mixture. It will be understood, however, that various other liquid solution anti-washout admixtures known to those skilled in the art may be found suitable for use in the method of the present invention.

Finally, the finished foam is a combination of foam solution and air which is mixed to form a stable bubble mass. As is described in certain of the patents which have been incorporated herein by reference, the foam solution may be prepared by mixing a foam concentrate material, such as "Mearlcel 3532 foam liquid" (from the Mearl Corporation, 220 West Westfield Ave., Roselle Park, N.J. 07204, U.S.A.) to a suitable dilution in water. For example, the solution may comprise about 2.5% by volume foam concentrate in water, and this may be mixed with entrained air to form a stable, microbubble foam having a typical density of about 2.40 pcf. It will be understood, however, that other foam materials, concentrations, and finished foam densities may be employed in the present invention as desired.

FIG. 3 shows schematically the major steps in the preparation of the anti-washout cellular cement grout in accordance with the present invention. As can be seen, cement dust and water are fed into a slurry mixture, which may be, for example, a horizontal mixer having a plurality of inclined mixing blades. To ensure a consistent water to cement ratio, the water is preferably fed to the slurry mixer by a metering pump, and the cement dust is fed to the mixer by a metered gravity-feed mechanism.

The superplasticizer may be added at any point in the "slurry" side of the system, or possibly even at or after the grout mixing pump in some embodiments of the invention, but it is preferably added at the slurry mixer, adjacent to or in combination with the water inlet, so as to facilitate mixing and fluidity of the slurry. Again, as will be described in greater detail below, the liquid superplasticizer admixture is preferably added by means of a metering pump.

The water and cement dust are mixed in the horizontal slurry mixer and discharged from this into the intake end of a colloidal mixer, as shown schematically in FIG. 3. Colloidal mixing is a critical step in creating a stable, homogenous cellular grout in the present invention, and must take place before addition of the foam material. It is believed that the colloidal mixing is necessary for free water to reach the bubbles when the finished foam is mixed with the slurry; this would not otherwise occur, because of the presence of the anti-washout admixture, and this is believed to be one reason the present invention is able to overcome the problems experienced with the Hoge system, as described above.

The slurry is drawn off from the bottom of the colloidal mixer by a high-speed, high-shear recirculation pump, which discharges the slurry back into the top of the mixer tub. This action breaks down and finely mixes the cement particles, resulting in an extremely smooth, runny cement slurry. The anti-washout admixture is added at the colloidal mixer, preferably on the discharge side of the recirculation pump, downstream of the intake end of the supply line take-off which leads to the grout mixing pump; this ensures that the anti-washout agent is thoroughly and evenly mixed into the slurry before it is fed to the grout mixing pump. Again, the anti-washout admixture is preferably added to the slurry using a metering pump which allows for precise control over the amount of this material which is used; the use of a liquid anti-washout solution in the present invention makes this metering possible, and it would not be possible to do this when using a dry admixture, such as that in the Hoge system.

After colloidal mixing of the slurry and addition of the anti-washout admixture, the slurry is taken under pressure from the discharge side of the recirculating pump to the intake side of the main grout mixing pump. Finished foam is also fed into the grout mixing pump on the intake side thereof so that the slurry and foam are mixed within the body of the pump to form the cellular grout. The cellular cement grout is then discharged from the mixing pump as indicated in FIG. 3, to be injected behind a tunnel liner or along a slipliner as shown in FIGS. 1 and 2, or in another selected placement site.

FIG. 4 shows an exemplary apparatus 50 for preparing the cellular cement grout in accordance with the present invention in greater detail, and in particular showing the metering pumps which control the supply of superplasticizer admixture and anti-washout admixtures. As can be seen, the major subassemblies of the system are the cement dust feed assembly 52, the horizontal mixing assembly 54, the superplasticizer metering assembly 56, the colloidal mixing assembly 58, the anti-washout admixture metering assembly 60, the finished foam supply assembly 62, and the grout mixing pump assembly 64.

The cement feed assembly includes a dust hopper 66 with a gravity feed metering assembly 68 at its lower end. The metering assembly includes a cutoff valve 70 and a rotary metering valve 72 which discharges the cement dust into a horizontal auger 74 driven by an electric motor 76.

The auger discharges the dust into the intake end of the horizontal mixer 78, where water also enters via supply line 80. The water is preferably supplied at a metered rate, using a Moyno™ pump or similar metering pump 81 (the operation, speed controls, and flow meters which are substantially similar to those used to meter the admixtures, as will be described in greater detail below); the metering of both the water and the cement dust ensures precise control over the water to cement ratio of the slurry.

As was noted above, the superplasticizer solution is also preferably added at the intake end of the horizontal mixer. The rate at which the superplasticizer is supplied is controlled by means of a metering pump 82 having an intake end which takes a suction on the superplasticizer reservoir tank 84. For precise metering of the solution, the pump 82 is preferably of the positive-displacement progressive cavity-type, such as those available in a variety of sizes under the trademark "Moyno" from Robbins & Meyers, Inc., Dayton, Ohio, driven by a variable-speed hydraulic motor 86. The output rate of the metering pump is directly proportional to its operating rate, and the speed of the drive motor is adjusted by means of a hydraulic speed control 88 mounted in the hydraulic pressure line, on the upstream side of the on/off cutoff valve for the motor. The operating speed of the pump is monitored by means of a tachometer 92 having a magnetic pickup 94 on the motor shaft, and the output rate is monitored by an in-line flow meter 96 mounted on discharge line 98 downstream of the pump; digital electromagnetic flow meters suitable for use in the present invention are available under the trademark "Flumag" from Schlumberger Industries, Measurement Division, 1310 Emerald Road, Greenwood, S.C. 29646. The reading output from the flow meter 98 is displayed at a control panel (not shown), along with the tachometer display for the superplasticizer metering pump. Similarly, the corresponding flow rate and operating speed readings for the other metering pumps are also displayed at the control panel, which is co-located with the hydraulic speed controls for each of the pump motors, so that the operator can monitor and precisely control the proportions of the various components of the grout by selectively adjusting the speed of the appropriate metering pumps.

The liquid superplasticizer admixture is mixed in with the water and cement dust to form the initial cement slurry, which is discharged from the horizontal mixer into the intake 100 of the colloidal mixing tub 102. As was described above, colloidal mixing of the slurry is achieved by circulating the slurry through a high-speed, high-shear recirculation pump 104, which is driven by a motor 106; suitable examples of this type of pump include the "Series A Centrifugal Process Pumps" available from Hayward Gordon, Buffalo, N.Y. The high speed shearing action of the colloidal mixing pump serves to break down the cement particles in the slurry, producing smaller and smaller cement particles which become fully surrounded by water molecules to from a highly-fluid, colloidal cement matrix. This yields an extreme change in the consistency of the cement slurry material, even though the water to cement ratio remains constant, and this is a critical aspect in the formation of a stable, homogenous anti-washout foamed cement grout, as was noted above. It is to be understood, however, that certain types of mixers, agitators, vibrators, or pumps other than high-speed, high-shear type pumps which are capable of producing colloidal mixing will occur to those skilled in the art, including for example a Deckmate™ high-speed paddle mixer available from Strong Manufacturing, Pine Bluff, Ark., and their use in the method which is disclosed herein is therefore within the scope of the present invention.

The colloidal mixing pump 104 takes a suction at the bottom of the slurry tub 102 through intake line 108, and then discharges the slurry back into the top of the tub in a generally tangential direction (not shown) through discharge line 110, as indicated by arrows 112a, 112b in FIG. 4.

As was noted above, the anti-washout admixture supply line 114 discharges into the slurry recirculation line 110, preferably towards the discharge end of this where it enters the mixer tub. The anti-washout admixture metering assembly 60 is generally similar in overall configuration to the metering assembly for the superplasticizer solution, in that this includes a metering pump 116 having an intake end which draws a suction on a reservoir 118 containing the anti-washout admixture solution, and which is driven by a variable speed hydraulic motor 120. As with the superplasticizer metering assembly, the speed of the motor is adjusted by a speed control valve 122 in the hydraulic pressure supply line, upstream of another on/off cutout valve 124. Similarly, a tachometer and a flow meter mounted in the solution line 114, downstream of the metering pump, provide outputs which are displayed at the same control panel (not shown). Again, this permits highly accurate metering and control of the rate at which the anti-washout admixture is added to the slurry, which is critical in view of the dramatic effect which improper proportions of this material can have on the final grout mixture (and also in view of the high cost of the admixture solution). For example, the operator can increase or decrease the amount of the anti-washout admixture component, depending on how wet conditions are at the injection site, and the amount of anti-washout agent can be reduced when it is not needed, in the interest of economy.

The slurry supply line 130 to the mixing pump is also connected to the discharge line from the colloidal mixing pump 104, but upstream of the anti-washout supply line 114. The colloidally mixed slurry is discharged through line 130, in the direction indicated by arrow 132, to the intake side of the main grout mixing/metering pump 134. As can be seen in FIG. 4, the grout mixing pump is preferably another Moyno™-type pump, substantially similar to the other metering pumps in its operation, although sized considerably larger due to its higher capacity. Accordingly, this is also driven by a variable speed hydraulic motor 136 controlled by a hydraulic speed control valve 138 and on/off cutoff valve 140, with a tachometer 142 on the pump drive and a flow meter 144 on the discharge line from the pump providing outputs to the control panel for monitoring/adjustment by the operator.

Finished foam is also supplied to the intake side of the grout metering/mixing pump 134, from the finished foam supply assembly 62. A suitable foam generation/supply assembly is described in Applicant's co-pending application Ser. No. 08/650,919 (see above), and another such system is disclosed in Applicant's U.S. Pat. No. 5,141,363, so only an overview of the system will be provided here. As can be seen, the foam supply assembly includes a reservoir 146 for holding a supply of foam solution (although foam concentrate and water may be mixed on-site at metered rates to form the solution, as is also described in certain of the above patents/applications which have been incorporated by reference). The foam solution is supplied to a mixing panel 148 via solution supply line 150, and compressed air is supplied to the mixing panel from an air storage tank 152 via air line 154. The foam solution and air are combined in the mixing panel, and are discharged from this through a foam conditioner 156 which produces the fine, stable, microbubble structure of the finished foam.

From the conditioner 156, the finished foam passes through the foam line 158 and check valve 160 into the intake side of the grout metering/mixing pump. The foam is then mixed with the colloidally mixed slurry within the body of the large Moyno™-type pump, and also within the first portion of the discharge line 162, so as to produce the homogenous, stable, washout-resistant cellular cement grout, which is then discharged to the selected injection site, in the direction indicated by arrow 164 in FIG. 4.

As was noted above, the various metering pumps which are used in the system shown in FIG. 4 permit the relative proportions of each of the constituents in the grout to be precisely monitored, controlled, and adjusted. It will be understood, however, that in some embodiments of the present invention one or more of the subsystems may be modified or deleted, depending on circumstances. For example, the large "self-contained" type system which is shown in FIG. 4 is particularly suitable for use on tunnel backfill projects where large volumes of cellular cement grout are needed. On slipliner grouting jobs, however, much smaller volumes of grout material are required, and it may not be economical to deploy all of the components shown in FIG. 4 to these or similar small job sites. Consequently, one or more of these steps may take place at a remote location, with final mixing and injection of the grout taking place at the job site. For example, the initial mixing of the cement slurry and one or more of the admixtures may take place at a mixing facility, and then the slurry may be trucked to the job site for colloidal mixing and formation of the grout. Furthermore, in some embodiments, the colloidal mixing itself may take place at a remote site or during transportation.

An exemplary washout resistant foamed cement grout mixture prepared as described above, and which is particularly suited for use as tunnel backfill material in a flooded annulus is set forth in the following table:

TABLE A

|  | Weight (lbs) | Volume | Unit Weight |
|---|---|---|---|
| Cement | 2,062 | 10.49 |  |
| Water | 1,030 | 16.51 |  |
|  | 3,092 | 27.00 | 114.52 pcf |
| Foam | 75 | 25 cf |  |
|  | 3,167 | 52 cf | 60.90 pcf |

Other examples of grout mixtures in accordance with the present invention, and the test results for compressive strength and shrinkage for the solidified product, are set forth in the following table:

TABLE B

|  | Mix 1 | Mix 2 | Mix 3 |
|---|---|---|---|
| Medusa Type I Cement | 94 lbs. | 94 lbs. | 94 lbs. |
| Water | 56.4 lbs | 56.4 lbs | 42.3 lbs |
| Anti Washout (PS1151) | 0 | 10 | 10 |
| Rheobuild 200B (oz/100#) | 0 | 0 | 12 |
| Flow before foaming, secs | 9.5 | 13 | 18.5 |

TABLE B-continued

|  | Mix 1 | Mix 2 | Mix 3 |
|---|---|---|---|
| Unit Weight, PCF | 110 | 101.0 | 109.6 |
| Weight of foam, PCF | 3.2 | 3.2 | 3.2 |
| Foam time, secs | 10 | 9 | 10 |
| Foamed unit weight, PCF | 60 | 60.2 | 59.7 |
| Flow after foaming, secs. | 21 | 33 | 50 |
| Compressive strength, Avg. psi |  |  |  |
| 7 days | 525 | 625 | 760 |
| 28 days | 840 | 945 | 980 |
| ASTM C596 procedure, % length change |  |  |  |
| 7 days | −.303 | −.287 | 0.349 |
| 14 days | N/T | N/T | N/T |
| 21 days | −.445 | −.334 | −.399 |
| 28 days | −.488 | −.369 | −.422 |
| ASTM C494 procedure, % length change |  |  |  |
| 14 days Moist | +.008 | +.001 | .000 |
| 28 days Air | −.162 | −.118 | −.199 |

As was noted above, suitable water-to-cement ratios for the grout of the present invention are in the range from about 0.4–1.0, and the foamed density of the grout may be from about 40–90 pcf, with 50–75 pcf being generally preferable for most projects. Also, for sliplining projects, it is generally preferred that the density of the foamed grout be kept approximate to or less than the density of the liner when full or partially full of water (depending on practical limitations) to avoid floating the liner.

It is to be recognized that various alterations, modifications, and/or additions may be introduced into the constructions and arrangements of parts described above without departing from the spirit or ambit of the present invention.

What is claimed is:

1. A method for grouting a water-flooded cavity, said method comprising the steps of:

combining hydraulic cement and water in predetermined amounts so as to form a fluid cement slurry, said cement slurry being substantially free of sand or other aggregate material;

colloidally mixing said cement slurry so as to achieve ultra-fine mixing thereof;

mixing an anti-washout admixture with said cement slurry in a predetermined amount, said anti-washout admixture being substantially free of defoaming agents;

mixing finished foam with said slurry after said slurry has been colloidally mixed and after said anti-washout admixture has been mixed with said slurry, so as to form a stable foamed cement grout; and injecting said foamed cement grout into said water-flooded cavity.

2. The method of claim 1, further comprising the step of:

mixing a superplasticizing agent with said cement slurry in a predetermined amount.

3. The method of claim 2, wherein the step of mixing an anti-washout admixture with said cement slurry comprises:

adding said anti-washout admixture to said cement slurry on a continuous basis at a predetermined metered rate.

4. The method of claim 3, wherein the step of mixing a superplasticizing agent with said cement slurry comprises:

adding said superplasticizing agent to said cement slurry on a continuous basis at a predetermined metered rate.

5. The method of claim 1, wherein said anti-washout admixture comprises a modified cellulose ether solution.

6. The method of claim 1, wherein the step of mixing hyrdaulic cement and water comprises:

mixing hydraulic cement and water in predetermined amounts so as to form a fluid cement slurry having a water-to-cement ratio in the range from about 0.4 to about 1.0.

7. The method of claim 6, wherein the step of mixing finished foam with said cement slurry comprises:

mixing finished foam with said cement slurry in predetermined amounts so as to form a foamed cement grout having a unit weight in the range from about 40 pounds per cubic foot to about 90 pounds per cubic foot.

8. The method of claim 7, wherein the step of mixing finished foam with said cement slurry comprises:

mixing finished foam with said cement slurry in predetermined amounts so as to form a foamed cement grout having a unit weight in the range from about 50 pounds per cubic foot to about 75 pounds per cubic foot.

9. The method of claim 7, wherein said anti-washout admixture comprises a modified cellulose ether solution.

10. The method of claim 9, wherein the step of mixing an anti-washout admixture with said cement slurry comprises:

mixing said anti-washout admixture with said cement slurry in an amount in the range from about 5 ounces to about 20 ounces per hundredweight of cement.

11. The method of claim 10, wherein the step of mixing an anti-washout agent with said cement slurry comprises:

mixing said anti-washout admixture with said cement slurry in an amount in the range from about 8 ounces to about 12 ounces per hundredweight of cement.

12. A composition for grouting grouting a water-flooded cavity, said composition comprising:

hydraulic cement and water combined in predetermined amounts so as to form a fluid cement slurry, said cement slurry being substantially free of sand or other aggregate material;

said cement slurry being colloidally mixed so as to achieve ultra-fine mixing thereof;

an anti-washout admixture mixed with said cement slurry in a predetermined amount, said anti-washout admixture being substantially free of defoaming agents; and finished foam mixed with said slurry after said slurry has been colloidally mixed and after said anti-washout admixture has been mixed with said slurry, so as to form a stable foamed cement grout.

13. The composition of claim 12, further comprising:

a superplasticizing agent mixed with said cement slurry in a predetermined amount.

14. The composition of claim 12, wherein said anti-washout admixture comprises a modified cellulose ether solution.

15. The composition of claim 12, wherein said fluid cement slurry has a water-to-cement ratio in the range from about 0.4 to about 1.0.

16. The composition of claim 15, wherein said foamed cement grout has a unit weight in the range from about 40 pounds per cubic foot to about 90 pounds per cubic foot.

17. The composition of claim 16, wherein said foamed cement grout has a unit weight in the range from about 50 pounds per cubic foot to about 75 pounds per cubic foot.

18. The composition of claim 16, wherein said anti-washout admixture comprises a modified cellulose ether solution.

19. The composition of claim 18, wherein said cement slurry comprises said anti-washout admixture mixed with said cement slurry in an amount in the range from about 5 ounces to about 20 ounces per hundredweight of cement.

20. A method for grouting a water-flooded cavity, said method comprising the steps of:

combining portland cement and water in predetermined amounts so as to form a fluid cement slurry having a water-to-cement ratio in the range from about 0.4 to about 1.0, said cement slurry being substantially free of sand or other aggregate material;

colloidally mixing said cement slurry so as to achieve ultra-fine mixing thereof;

mixing an anti-washout admixture with said cement slurry in a predetermined amount, said anti-washout admixture comprising a modified cellulose ether solution which is substantially free of defoaming agents;

mixing a superplasticizing agent with said cement slurry in a predetermined amount, said superplasticizing agent being substantially free of defoaming agents;

mixing finished foam with said slurry after said slurry has been colloidally mixed and after said anti-washout admixture has been mixed with said slurry, so as to form a stable foamed cement grout having a unit weight in the range from about 40 pounds per cubic foot to about 90 pounds per cubic foot; and injecting said foamed cement grout into said water-flooded cavity.

* * * * *